(12) United States Patent
Mu et al.

(10) Patent No.: US 7,226,378 B2
(45) Date of Patent: Jun. 5, 2007

(54) DRIVING DEVICE FOR AUTOMATICALLY EXERTING A VARIABLE TORQUE ON AN OUTPUT SHAFT THAT ROTATES AT A CONSTANT SPEED

(76) Inventors: Chung-Nan Mu, 3rd Floor, No. 48-2, Alley 103, Second Section, Nei-Hou Road, Taipei (TW); Yu-Ta Tu, 6th Floor, No. 14, Alley 327, Third Section, Chang-Chun Road, Chu-Dong, Hsin-Chu (TW)

( * ) Notice: Subject to any disclaimer, the term of this patent is extended or adjusted under 35 U.S.C. 154(b) by 0 days.

(21) Appl. No.: 11/329,280

(22) Filed: Jan. 11, 2006

(65) Prior Publication Data
US 2006/0169100 A1  Aug. 3, 2006

Related U.S. Application Data

(62) Division of application No. 10/102,748, filed on Mar. 22, 2002, now Pat. No. 7,017,447.

(51) Int. Cl.
*F16H 33/04* (2006.01)
(52) U.S. Cl. .................. 475/151; 475/210; 475/257; 475/267
(58) Field of Classification Search .............. 475/210, 475/257, 267, 151; 310/153, 74
See application file for complete search history.

(56) References Cited

U.S. PATENT DOCUMENTS 3,064,149 A * 11/1962 Baermann .................... 310/93
3,870,116 A    3/1975 Seliber ....................... 180/165
3,886,810 A    6/1975 Sugiyama et al. ............. 477/41
4,499,965 A    2/1985 Oetting et al. ................ 74/572
4,525,661 A    6/1985 Mucsy et al. .................. 322/4
4,563,914 A *  1/1986 Miller ......................... 475/80
4,588,040 A    5/1986 Albright et al. ............... 74/572
5,569,108 A * 10/1996 Cadee et al. ................... 475/1
5,747,902 A *  5/1998 Takara ...................... 310/75 D
6,274,959 B1*  8/2001 Uchiyama .................... 310/152
6,488,605 B2  12/2002 Van Druten et al. .......... 475/210
6,680,883 B2*  1/2004 Inui et al. ................. 369/44.14
6,781,270 B2*  8/2004 Long ......................... 310/90.5
6,803,696 B2* 10/2004 Chen .......................... 310/268
2002/0135251 A1*  9/2002 Mu et al. .................... 310/152
2006/0028080 A1*  2/2006 Sprain ........................ 310/152

* cited by examiner

Primary Examiner—Sherry Estremsky
(74) Attorney, Agent, or Firm—Bacon & Thomas, PLLC

(57) ABSTRACT

A driving device includes a power supply unit and a torque converter. The power supply unit outputs a constant power. The torque converter has a gear train that is connected to the power supply unit and interconnects a flywheel and an input shaft in order to respectively transmit a first part and a second part of the power to the flywheel and the input shaft. The input and output shafts have respectively first and second variable-diameter pulleys on which a belt member is trained. The effective diameters of the first and second pulleys are automatically varied in response to the torque exerted on the input and output shafts to maintain the rotational speed of the output shaft at a constant level while the flywheel compensates for power variation of the output shaft without changing the power of the power supply unit.

2 Claims, 11 Drawing Sheets

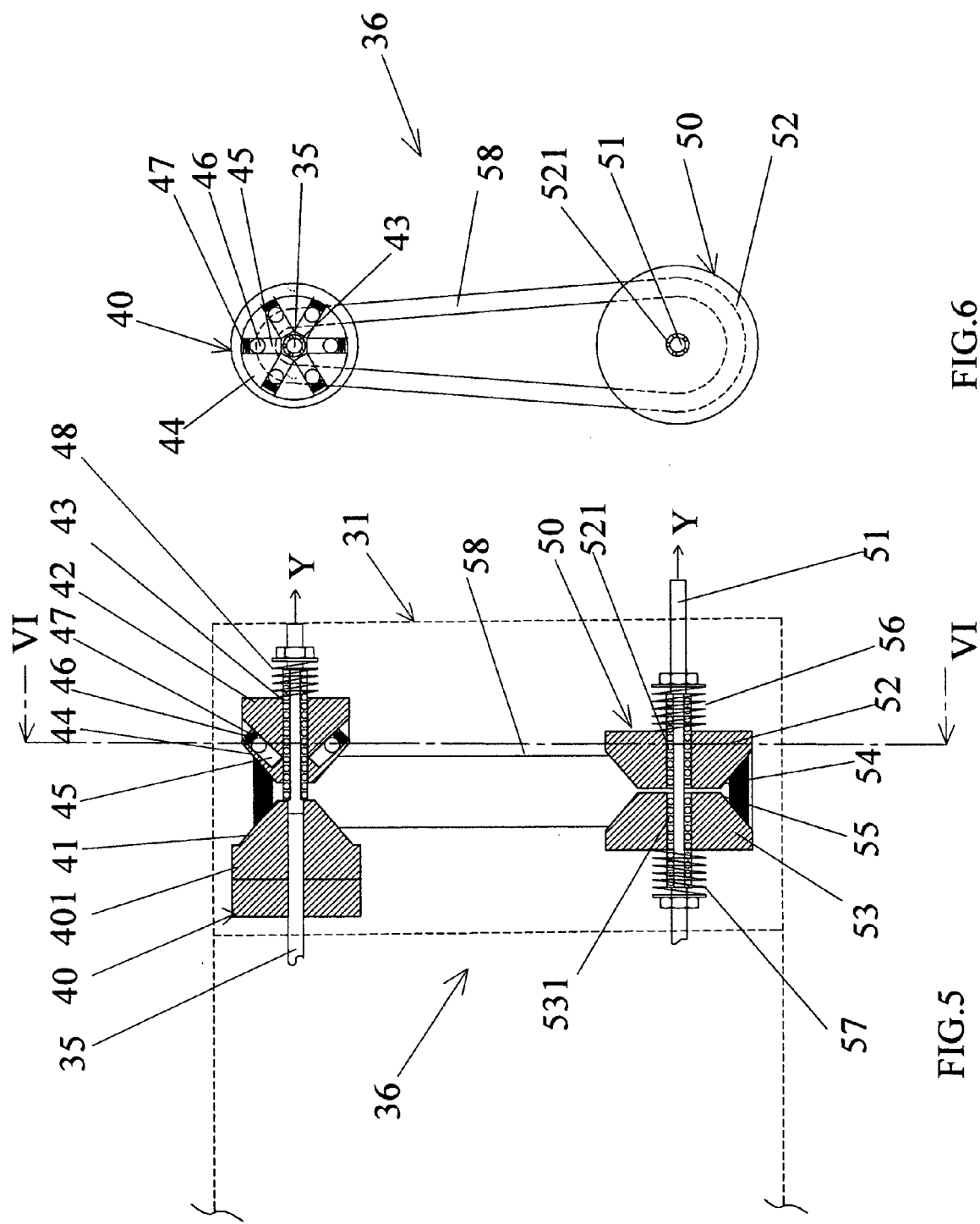

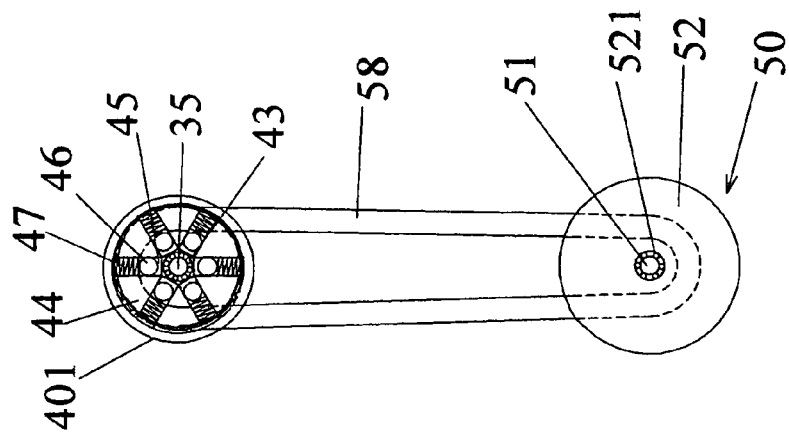
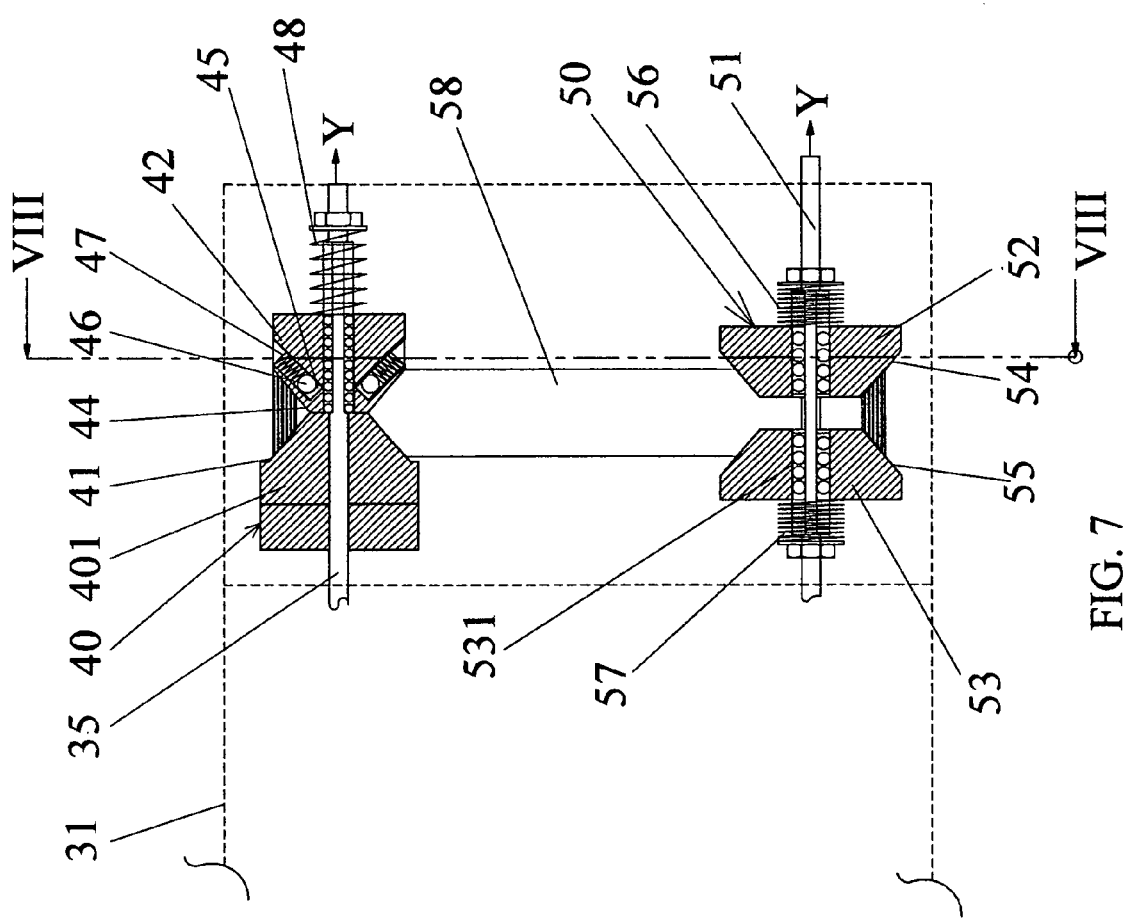
FIG. 8
FIG. 7

DRIVING DEVICE FOR AUTOMATICALLY EXERTING A VARIABLE TORQUE ON AN OUTPUT SHAFT THAT ROTATES AT A CONSTANT SPEED This application is a Division of nonprovisional application Ser. No. 10/102,748, filed Mar. 22, 2002, now U.S. Pat. No. 7,017,447.

BACKGROUND OF THE INVENTION

1. Field of the Invention

This invention relates to a driving device, and more particularly to a driving device for automatically exerting a variable torque on an output shaft, which rotates at a constant speed.

2. Description of the Related Art

Conventional driving devices include a power supply unit such as a motor, engine, etc., and a transmission unit, connected to the power supply unit to transmit power from the power supply unit to a load. The transmission unit may have a torque converter for changing a torque-speed ratio between an input shaft and an output shaft thereof.

A typical torque converter includes a gear train that can be operated by a gearshift, to output a variable torque that is required by a variable load. However, a problem with this conventional arrangement is that the user has to frequently manipulate the gearshift to ensure that a proper torque is exerted on the output shaft in response to the variable load. In addition, the rotational speed of the output shaft changes when the torque exerted on the output shaft is varied.

Accordingly, when the conventional driving device is used to drive a machine, such as an electric generator, etc., the operator must frequently adjust the power from the power supply unit to maintain the output shaft at a constant rotational speed, so as to allow the machine to work in a steady state. This causes an inconvenience to the operator.

SUMMARY OF THE INVENTION

The object of the present invention is to provide a driving device for automatically exerting a variable torque on an output shaft that rotates at a constant speed.

According to the present invention, the driving device comprises a power supply unit and a torque converter. The power supply unit outputs a constant power. The torque converter has a gear train, a flywheel, an input shaft, an output shaft and a belt member. The gear train is connected to the power supply unit and interconnects the flywheel and the input shaft in order to transmit respectively a first part and a second part of the power to the flywheel and the input shaft. The input shaft has a first variable-diameter pulley mounted thereon. The output shaft has a second variable-diameter pulley mounted thereon. The belt member is trained on the first and second variable-diameter pulleys under tension to transmit the second part of the power from the input shaft to the output shaft. The second part of the power exerts a torque on and rotates the input and output shafts at a predetermined rotational speed. Each of the first and second variable-diameter pulleys has first and second half portions that are movable toward and away from one another along a respective one of the input and output shafts in order to change an effective diameter thereof. The second half portion of the first variable-diameter pulley has a control unit that enables the second half portion to move away from and toward the first half portion of the first variable-diameter pulley when a rotational speed of the first variable-diameter pulley increases and decreases. The first and second half portions of the second variable-diameter pulley moves toward and away from one another to increase and decrease the effective diameter thereof while the first and second half portions of the first variable-diameter pulley move away from and toward one another to decrease and increase correspondingly the effective diameter thereof in order to maintain belt tension.

When the torque exerted on the output shaft by a load increases and decreases, the rotational speed of the input shaft decreases and increases correspondingly, and a rotational speed of the flywheel decreases and increases to transmit and receive power to and from the output shaft while the second half portion of the first variable-diameter pulley moves automatically toward and away from the first half portion of the first variable-diameter pulley by means of the control unit in order to enable the predetermined rotational speed of the output shaft to remain constant without increasing and decreasing the power from the power supply unit.

BRIEF DESCRIPTION OF THE DRAWINGS

Other features and advantages of the present invention will become apparent in the following detailed description of the preferred embodiments of the invention, with reference to the accompanying drawings, in which:

FIG. 5 is a sectional schematic view of a portion of the torque converter shown in FIG. 2, in a first operative position;

FIG. 6 is a cross-sectional view taken along the lines VI—VI of FIG. 5;

FIG. 7 is a sectional schematic view of the portion of the torque converter shown in FIG. 5, in a second operative position;

FIG. 8 is a cross-sectional view taken along the lines VIII—VIII of FIG. 7;

DETAILED DESCRIPTION OF THE PREFERRED EMBODIMENT

Figure 1:
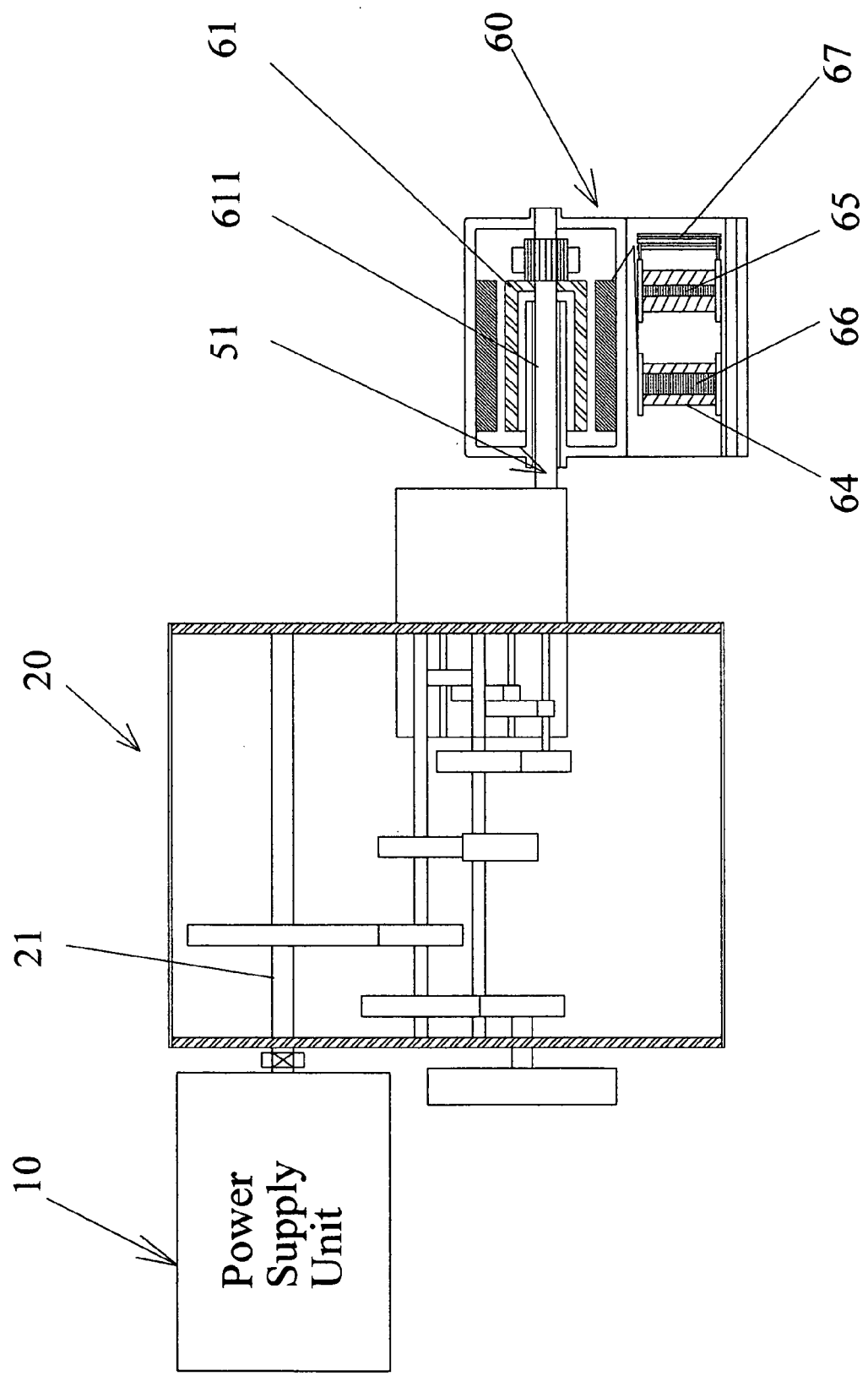
FIG. 1 is a schematic view of a preferred embodiment of a driving device according to the present invention.

Referring to FIG. 1, an exemplary embodiment of a driving device according to the present invention is shown to include a power supply unit 10 and a torque converter 20.

Figure 2:
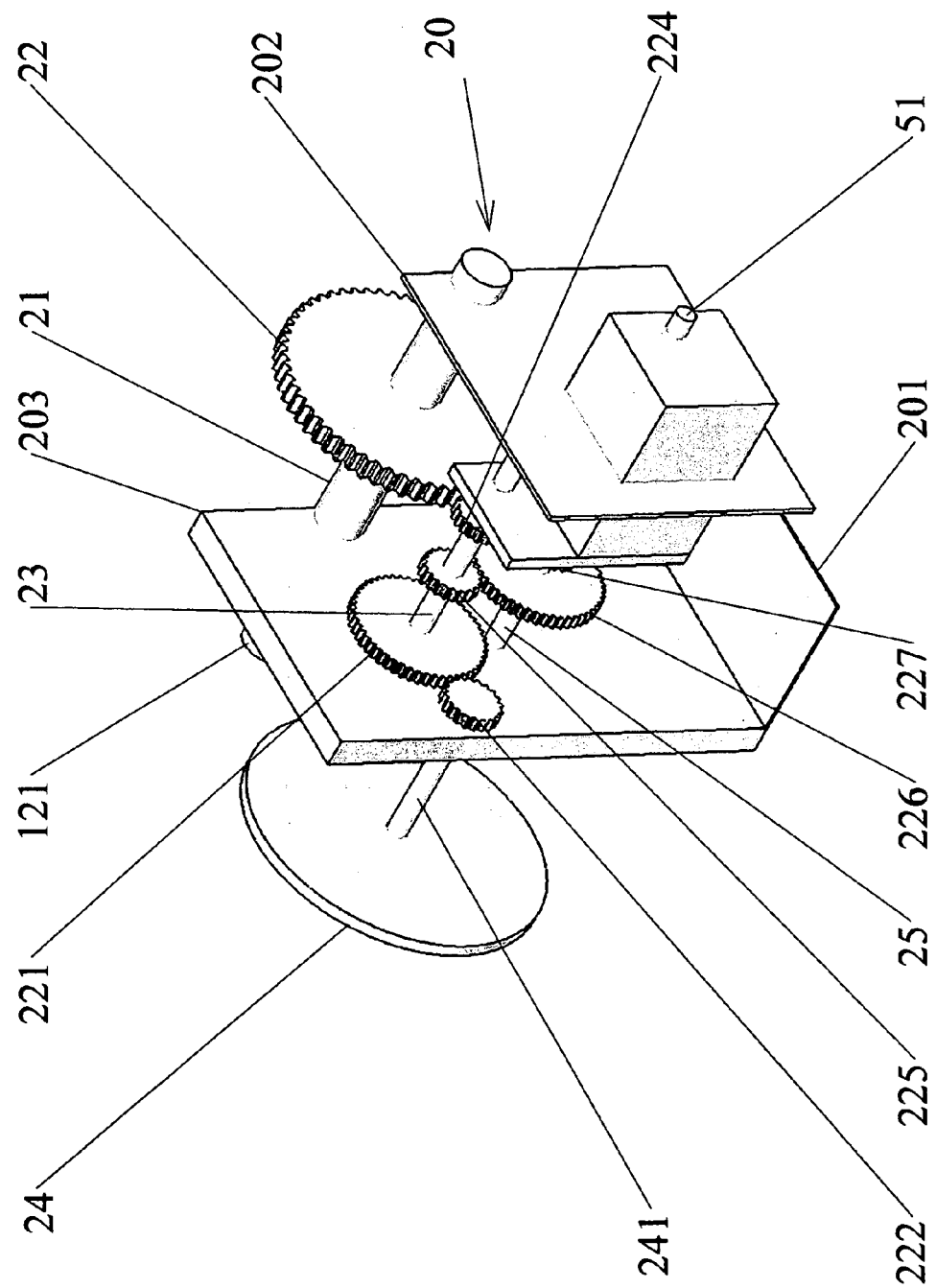
FIG. 2 is a perspective view of a torque converter of the driving device shown in FIG. 1.
Figure 3:
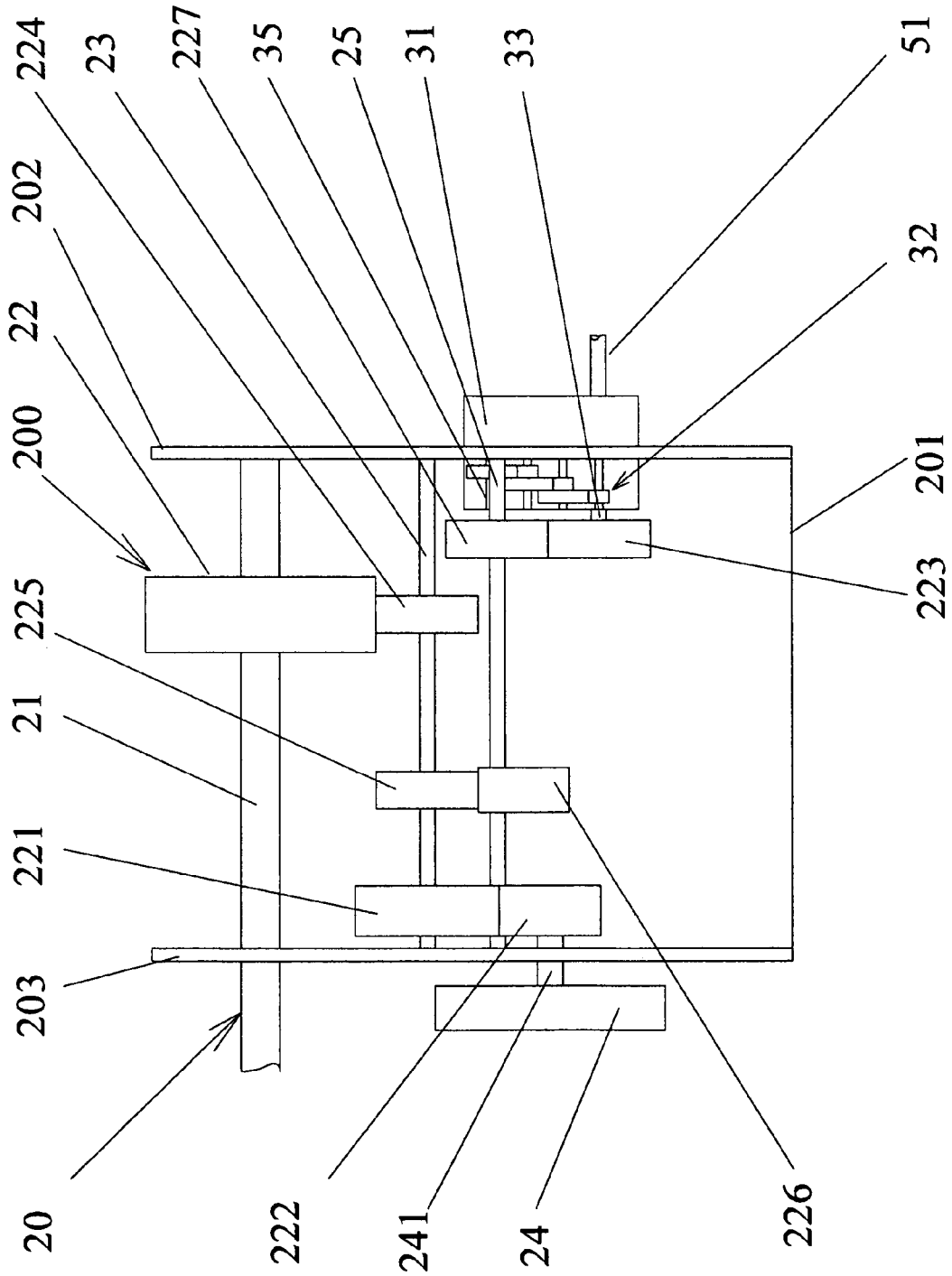
FIG. 3 is a plane schematic view of the torque converter shown in FIG. 2.
Figure 4:
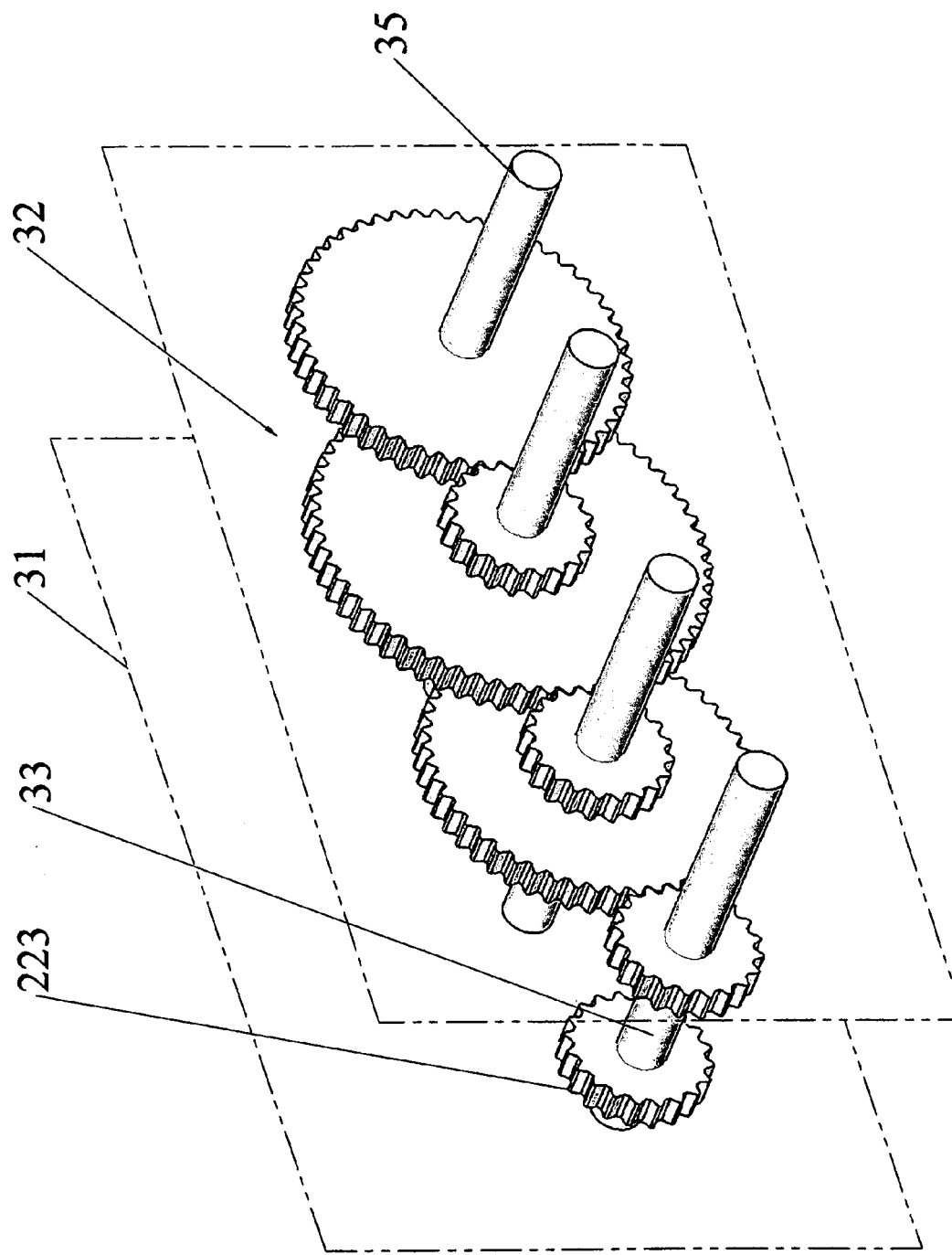
FIG. 4 is a perspective schematic view of a speed reduction gear train of torque converter shown in FIG. 2.

As shown in FIGS. 2, 3 and 4, the torque converter 20 has first, second and third transmission shafts 21,23,25 that rotatably extend between two upright walls 202, 203 of a support 201. The first transmission shaft 21 is coaxially connected to an output shaft 121 of the power supply unit 10, so that the first transmission shaft serves as an input shaft for the torque converter 20.

The torque converter 20 further has a gear train 200 that includes a first gear 22, a second gear 224, a third gear 225, a fourth gear 226, a fifth gear 227, a large gear 221 and a small gear 222. The first gear 22 is fixed to the input shaft 21, and the second gear 224 is fixed to the second transmission shaft 23. The first gear 22 is engaged with the second gear 224. The third gear 225 and the large gear 221 are also fixed to the second transmission shaft 23, and engage the fourth gear 226 and the small gear 222, respectively. The fourth gear 226 and the fifth gear 227 are fixed to the third transmission shaft 25. The small gear 222 is connected to a rotary shaft 241 that extends through the upright wall 203. The rotary shaft 241 is connected to a flywheel 24. The fifth gear 227 engages a gear 223 that is fixed to a rotary shaft 33, as best shown in FIG. 4.

The gear train 200 further has a speed reduction gear assembly 32. The speed reduction gear assembly 32 is disposed in a housing 31 that is fixed to the upright wall 202, and interconnects the rotary shaft 33 with a rotatable shaft 35. Rotatable shaft 35 serves as an output shaft for the speed reduction gear assembly 32, and as an input shaft for an operating drive ratio changing arrangement 36 of the torque converter 20, as shown in FIGS. 5–8.

Referring also to FIGS. 5–8, the operating drive ratio changing arrangement 36 is disposed in the housing 31. This arrangement 36 includes a rotatable output shaft 51 that is coaxially connected, for example, to an armature shaft 611 of an electric generator 60 (see FIG. 1). A belt member 58 interconnects the output shaft 51 and the input shaft 35. In an exemplary aspect of the invention, the belt member 58 is a V-belt.

The input shaft 35 has a first variable-diameter pulley 40 thereon. The output shaft 51 has a second variable-diameter pulley 50 thereon. The belt member 58 is placed on the first and second variable-diameter pulleys 40, 50 under tension.

More specifically, and with reference to FIGS. 5 and 6, the first variable-diameter pulley 40 has a first half portion 401 that is fixed to the input shaft 35, and a second half portion 42 connected to a linear bearing 43 that allows the second half portion to be axially movable on and rotatable together with the input shaft 35. The first half portion 401 and the second half portion 42 have symmetrical, conical ends 41, 44 that are tapered toward one another. The input shaft 35 has a first spring member 48 mounted thereon in order to bias the conical end 44 of the second half portion 42 toward the conical end 41 of the first half portion 401.

The second variable-diameter pulley 50 has first and second half portions 52, 53 respectively connected to linear bearings 521, 531, so that the first and second half portions are axially movable on, and rotatable together with the output shaft 51. The half portions 52, 53 have symmetrical conical ends 54,55 that are tapered toward each other. The output shaft 51 further has two second spring members 56,57 mounted thereon in order to bias the conical ends 54, 55 of the half portions 52,53 toward one another. The first and second spring members 48, 56, 57 cause the belt member 58 to be disposed on the conical ends 41, 44, 54, 55 of the first and second variable-diameter pulleys 40, 50 under tension.

The second half portion 42 of the first variable-diameter pulley 40 further has a control unit that includes a plurality of equally spaced guide grooves 45 formed around the conical end 44. Each of the guide grooves 45 is inclined toward the input shaft 35 and the first half portion 41, and each has a ball 46 that is received therein and that is biased by a coiled spring 47. When the input shaft 35 rotates, the balls 46 move in the guide grooves 45 to exert a centrifugal force on the second half portion 42. As such, the second half portion 42 will move away from the first half portion 401 and against the biasing force of the first spring member 48 when the rotational speed of the input shaft 35 is increased. Further, the second half portion 42 will move toward the first half portion 401 by virtue of the biasing force of the first spring member 48 when the rotational speed of the input shaft 35 is decreased. Accordingly, the effective diameter of the first variable-diameter pulley 40 can be automatically varied according to the rotational speed of the input shaft 35. Further, the increasing and decreasing of the effective diameter of the first variable-diameter pulley 40 causes the half portions 52, 53 of the second variable-diameter pulley 50 to move toward and away from one another under the influence of the biasing forces of the second spring members 56,57, thereby maintaining the belt under tension and affecting an increase and decrease of the effective diameter of the second variable-diameter pulley 50. As such, the operating drive ratio can be automatically changed.

The operations of the driving device of the present invention will be described below.

When the power supply unit 10 outputs, for example, a power of 804 horsepower (HP), 375 HP may be transmitted to the input shaft 35 and 429 HP may be transmitted to the flywheel 24, respectively. Since power is the product of torque and rotational speed, the input shaft 35 can, for example, rotate at 1760 rpm and exert a 1119 ft-lb torque while the flywheel 24 can, for example, rotate at 1760 rpm and exert a 1280 ft-lb torque. At the same time, the power of the input shaft 35 is transmitted to the output shaft 51 via the belt member 58 to exert, for example, a 1119 ft-lb torque on the output shaft 51 and rotate the output shaft 51 at a speed of 1760 rpm. As such, the armature shaft 611 of the electric generator 60, for example, can rotate at the speed of 1760 rpm when a 1119 ft-lb torque is exerted thereon. When the electric generator 60 requires greater power, for example, 750 HP, the rotational speed of the input shaft 35 will be decreased to 880 rpm so that a 2238 ft-lb torque will be exerted on the output shaft 51. Meanwhile, the rotational speed of the flywheel 24 will be reduced to 880 rpm so that a 1119 ft-lb torque will be exerted thereon in order to transmit an additional power of 375 HP to the output shaft 51 through the input shaft 35, without increasing the power from the power supply unit 10. At this time, the rotational speed of the second half portion 42 thus decreases, thereby reducing the centrifugal force of the balls 46 in the guide grooves 45. The balls 46 will be pushed toward the input shaft 35 by the coiled springs 47, as best illustrated in FIGS. 7 and 8. As such, the second half portion 42 will be moved toward the first half portion 401 by the biasing force of the first spring member 48, thereby increasing the effective diameter of the first variable-diameter pulley 40. Further, the first and second half portions 52, 53 will move away from one another against the biasing forces of the second spring members 56,57 to maintain belt tension, as best illustrated in FIG. 7. As a result, the rotational speed of the output shaft 51 will be prevented from decreasing due to the increasing of the torque exerted thereon and will be maintained at 1760 rpm, while a 2238 ft-lb torque will be exerted on the output shaft 51 to output a power of 750 HP.

When the power requirements of the electric generator 60 are decreased, the excess power will be transmitted to the flywheel 24. The rotational speeds of the flywheel 24 and the input shaft 35 will be increased simultaneously. As such, the effective diameter of the pulley on the input shaft 35 will decrease because the first and second half portions 401,42 will move away from one another by means of the centrifugal force of the balls 46, while the effective diameter of the pulley on the output shaft 51 will increase. In this way, the rotational speed of the output shaft 51 can be maintained constant. In addition, the torque exerted on the input and output shafts 35,51 will decrease when the excess power is transmitted from the output shaft 51 to the flywheel 24.

It is noted that when the power of the electric generator 60 is varied, the flywheel 24 compensates for the power variation at the output shaft 51 by transmitting and receiving power to and from the output shaft 51 via the input shaft 35. Therefore, the output power of the power supply unit 10 need not be increased or decreased to maintain the output shaft 51 at a constant rotational speed. An object of the present invention is thus met.

Referring again to FIG. 1, the electric generator 60 is disposed adjacent to the torque converter 20. The electric generator 60 has an armature 61 disposed in a magnetic field formed therein. The armature shaft 611 interconnects the output shaft 51 and the armature 61. As such, the armature 61 can be continuously rotated at a constant speed by the output shaft 51. Therefore, a current is continuously output from the electric generator 60 via the armature 61.

An electric power regulator 64 may be electrically connected to the armature 61 of the electric generator 60. The electric power regulator 64 has a transformer 66 disposed therein in order to output a stable given voltage in a conventional manner. A switch voltage regulator converter 65 has a control circuit 67 that is connected to the electric power regulator 64. As such, a set current can be output from the switch voltage regulator converter 65.

The power supply may be any power source, such as an internal combustion engine, or an electric or magnetically driven motor, for example. However, it is preferred if the power source provides a constant output power.

Figure 9:
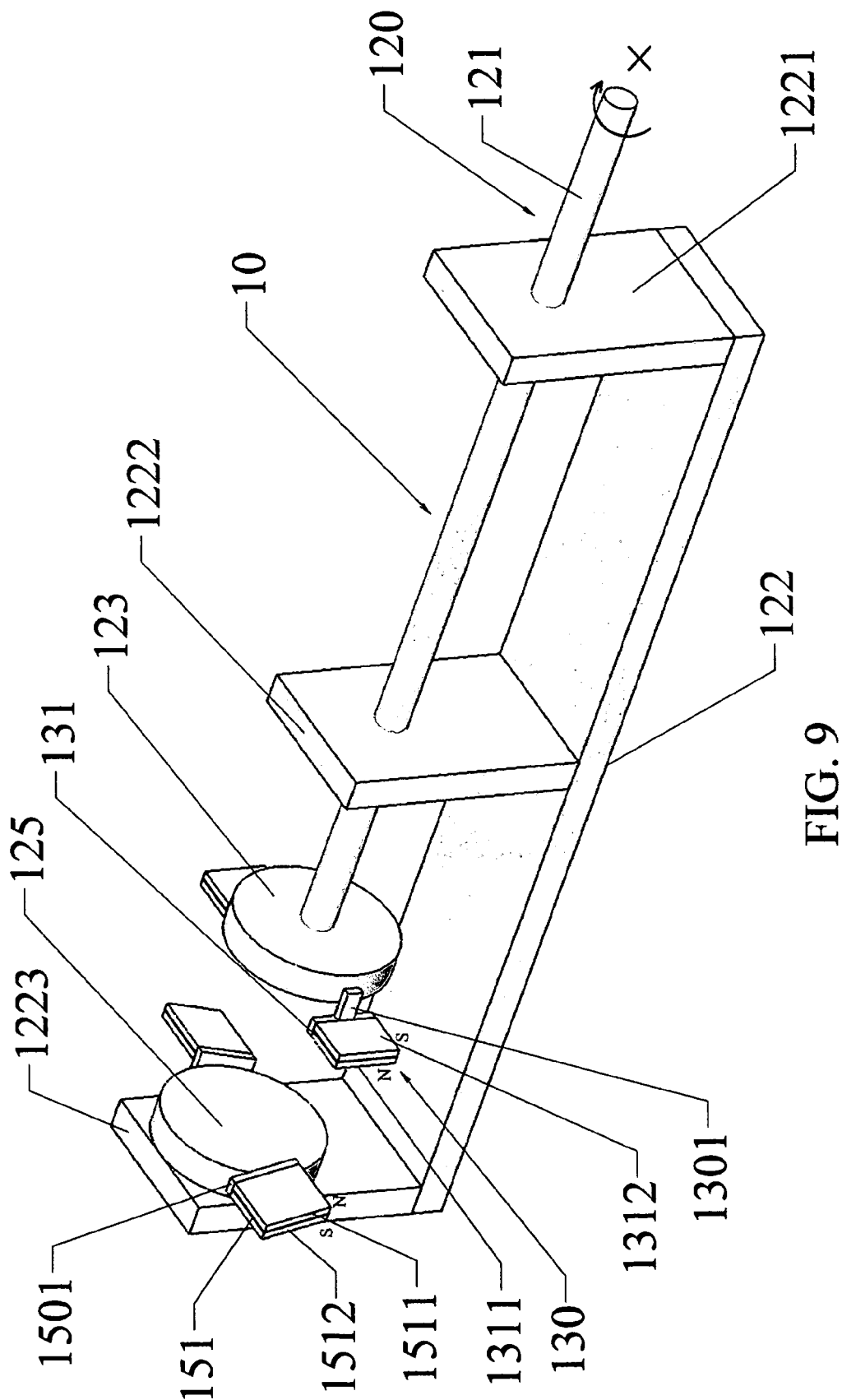
FIG. 9 is a perspective view of an exemplary power supply unit according to the present invention.
Figure 10:
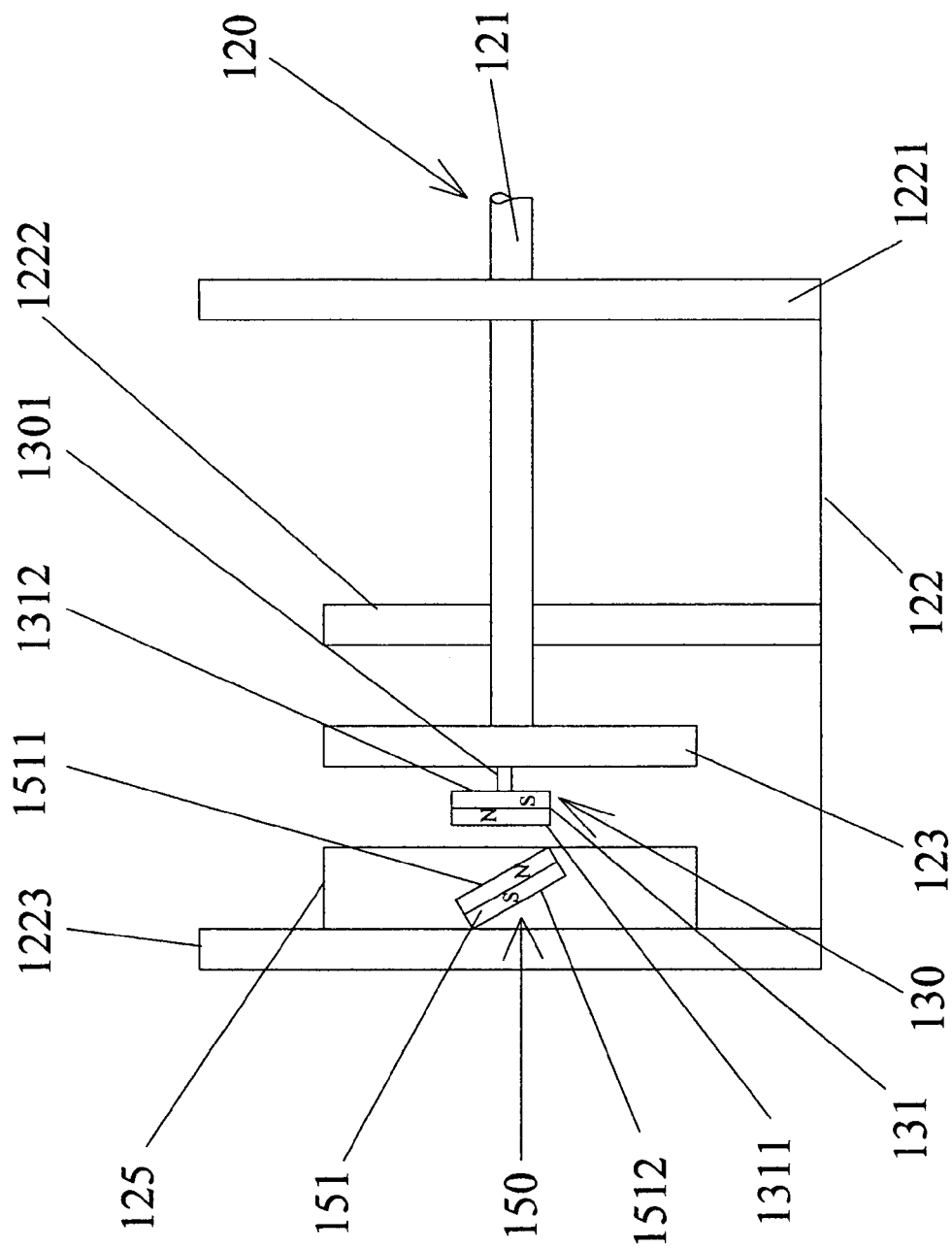
FIG. 10 is a schematic view of the power supply unit in an interaction position.
Figure 12:
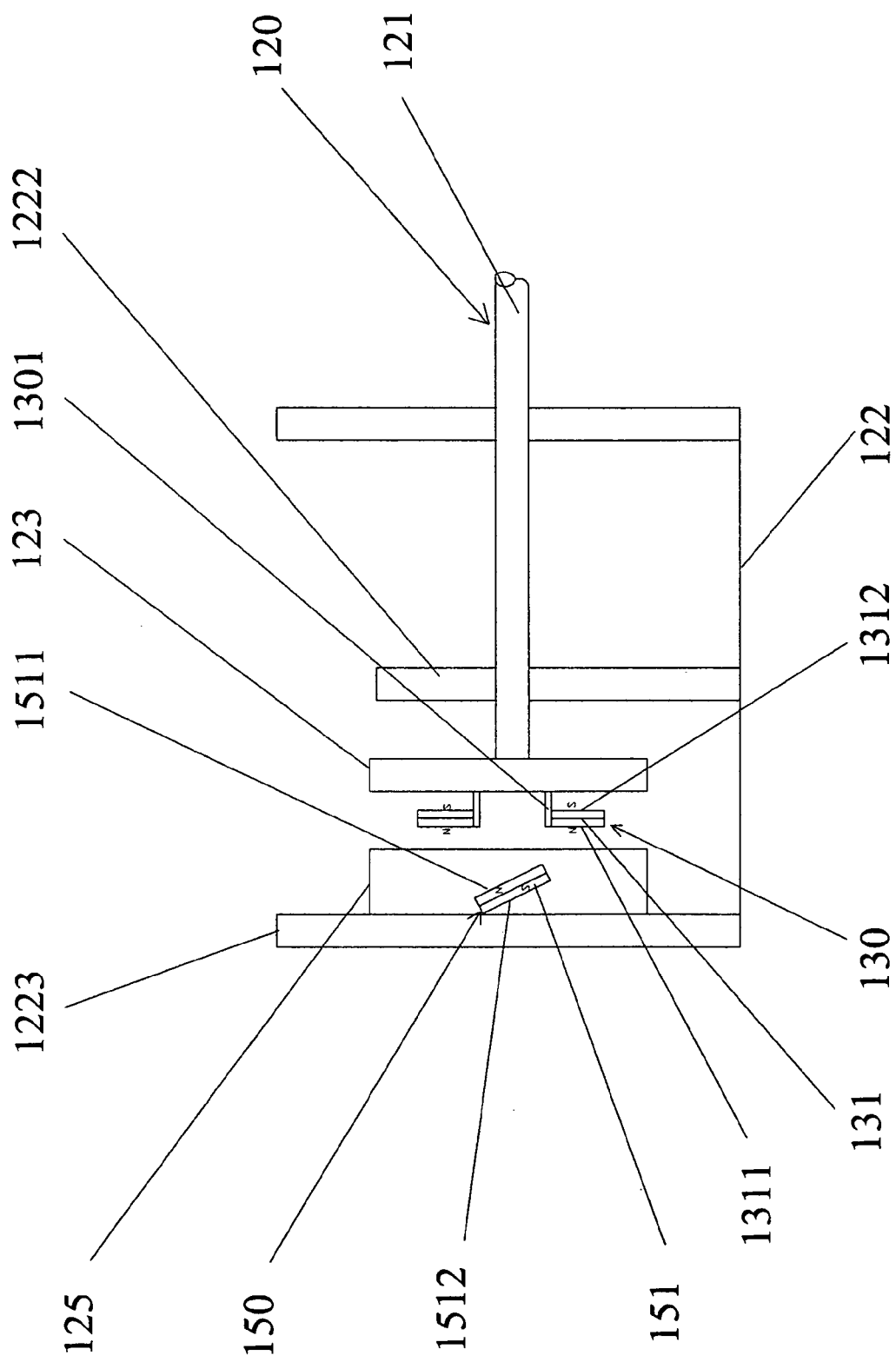
FIG. 12 is a schematic view illustrating the power supply unit in a counterbalance position.

Referring to FIGS. 9, 10 and 12, an exemplary power supply unit 10 includes a base 122, a first magnetic device 150, a second magnetic device 130, and a transmission member 120. In this embodiment, the base 122 has first, second and third support plates 1221, 1222, 1223 extending upwardly from the base 122 in a parallel relationship.

The transmission member 120 includes output shaft 121 extending transversely through and journalled to the first and second support plates 1221, 1222. As such, the shaft 121 can rotate about a longitudinal axis thereof. The transmission member 120 further has a circular disk 123 that is located between the second and third support plates 1222, 1223. The circular disk 123 is coaxially fixed to the shaft 121. The third support plate 1223 has a stationary member, such as disk 125 fixed to a side face thereof and coaxial with the longitudinal axis of the shaft 121.

The second magnetic device 130 has two arms 1301 extending axially and diametrically from the circular disk 123 toward the third support plate 1223. Two second magnets 131 are respectively connected to the distal ends of the arms 1301. The N poles 1311 and the S poles 1312 of the second magnets 131 are juxtaposed in a direction parallel to the longitudinal axis of the shaft 121.

The first magnetic device 150 has two inclined arms 1501 fixed to the stationary disk 125. The inclined arms 1501 are diametrically disposed relative to the stationary disk 125. One of the inclined arms 1501 is inclined upwardly toward the circular disk 123, and the other one of the inclined arms 1501 is inclined downwardly toward the circular disk 123.

The first magnetic device 150 further has two first magnets 151 respectively connected to the inclined arms 1501. The N poles 1511 and the S poles 1512 of the first magnets 151 are juxtaposed to one another such that the N poles 1511 are adjacent to the second magnetic device 130 while the S poles 1512 are distal from the second magnetic device 130, as best illustrated in FIGS. 10 and 12.

With this arrangement, the second magnetic device 130 is rotatable together with the shaft 121 of the transmission member 120 in a first direction as indicated by the arrow X in FIG. 9 to periodically pass by the first magnetic device 150. The magnetic fields of the first and second magnets 151, 131 interact with one another when the respective second magnets 131 pass by the respective first magnets 151, to alternately exert a positive force (i.e., a force in the clockwise direction) and a negative force (i.e., a force in the counterclockwise direction) on the first and second magnetic devices 150, 130. The positive force causes the second magnetic device 130 to rotate relative to the first magnetic device 150 in the first direction X. The negative force enables the second magnetic device to move relative to the first magnetic device in a second direction that is opposite to the first direction.

Figure 11:
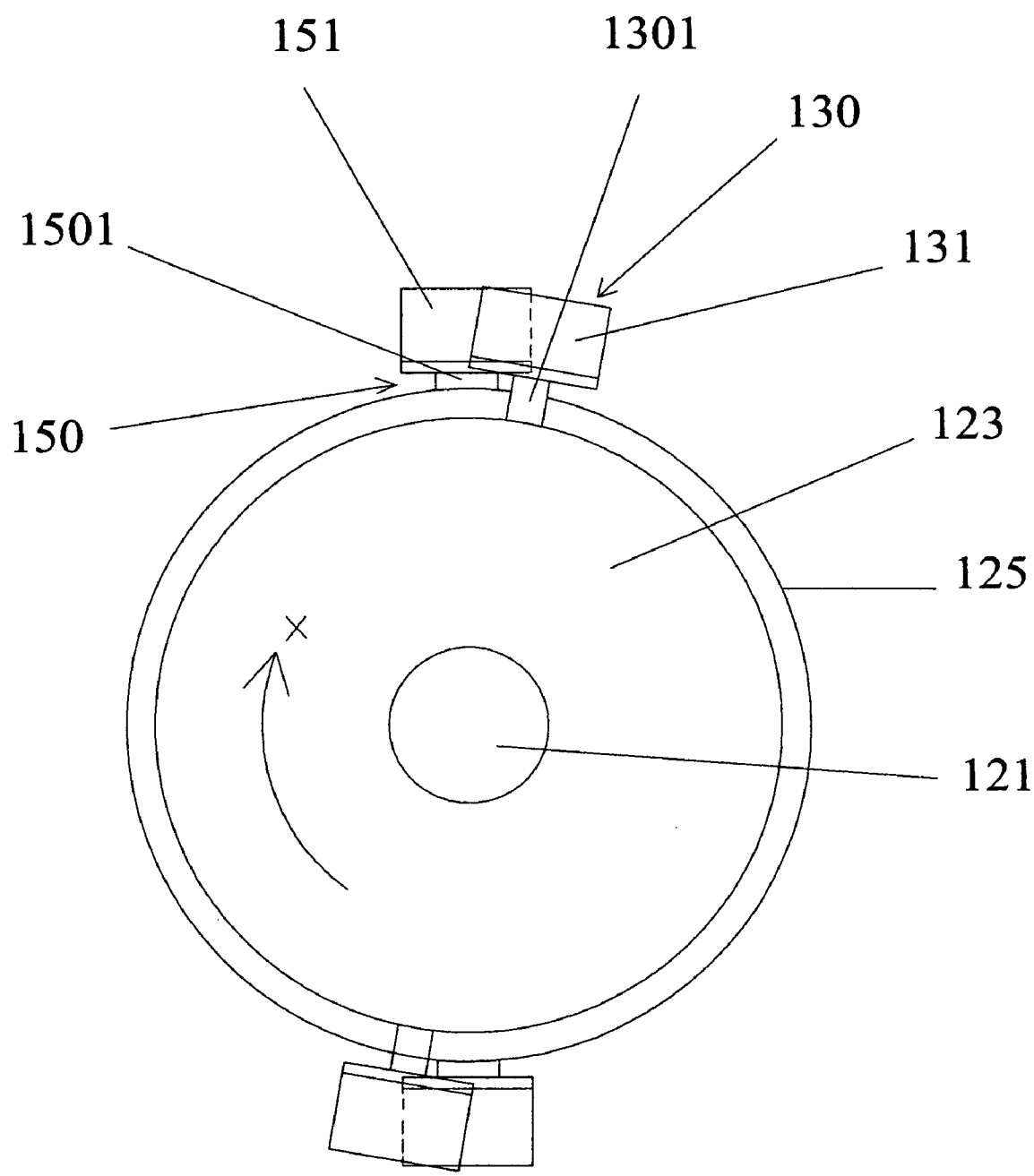
FIG. 11 is a left side view of a second magnetic device of the power supply unit of FIG. 10.

More specifically, with reference to FIGS. 10 and 11, when the first magnets 151 and the second magnets 131 are disposed in an interaction position, the N poles 1511 of the first magnets 151 and the N poles 1311 of the second magnets 131 will be adjacent to, and interact with one another to exert a repulsion force on the first and second magnets 151, 131. This produces the positive force that is exerted on the second magnets 131 to rotate the same in the first direction X.

Figure 13:
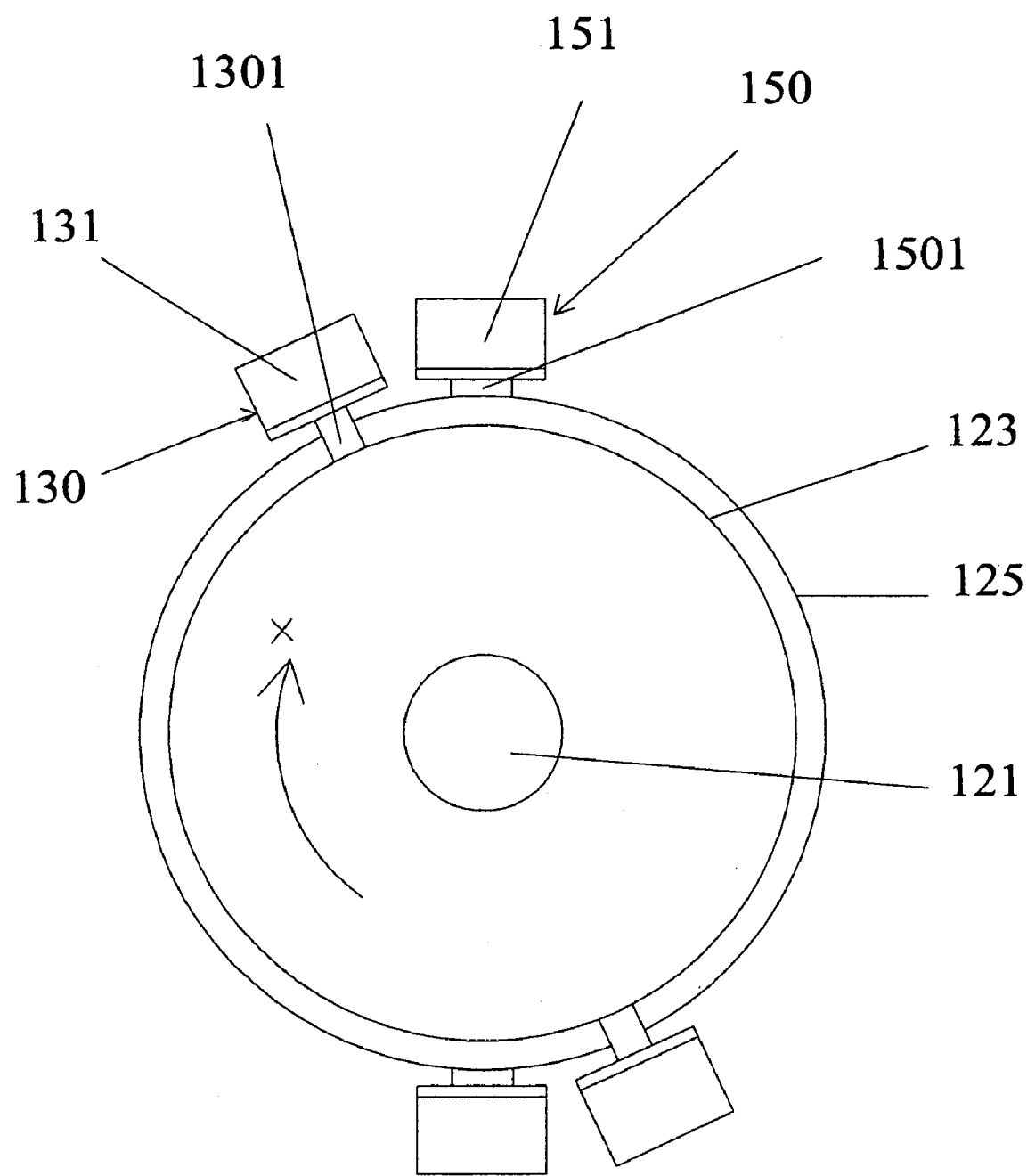
FIG. 13 is a left side view of the second magnetic device of the power supply unit of FIG. 12.

The rotation of the second magnets 131 enables the transmission member 120 to rotate, thereby exerting a relatively large inertia force on the second magnetic device 130. With reference to FIGS. 12 and 13, when the second magnets 131 rotate and approach the first magnets 151 into a counterbalance position, the N poles 1311 of the second magnets 131 approach the N poles 1511, and the S poles 1512 of the first magnets 151 will be inclined with respect to the second magnets 131. Since the N poles 1511 of the first magnets 151 are closer to the N poles 1311 of the second magnets 131 than the S poles 1512 of the first magnets 151, a relatively large repulsion force is produced by virtue of the interaction of each of the N poles 1511 and each of the N poles 1311 of the first magnets 131, while a relatively small attraction force is produced by virtue of the interaction of each of the S poles 1512 and each of the N poles 1311 of the first magnets 131. The resultant force of the relatively large repulsion force and the relatively small attraction force produces a negative force that is less than the positive force. As such, when the second magnets 131 rotate to the counterbalance position with respect to the first magnets 151, the second magnets 131 have exerted on them a resultant force of the positive force and the inertia force that is greater than the negative force. Therefore, the second magnets 131 can keep rotating in the first direction X. In this way, the second magnets 131 can rotate back to the interaction position with respect to the first magnets 151. As a result, the positive magnetic force can be exerted on the second magnetic device 130 such that the positive magnetic force and the inertia force cause the shaft 121 to continue to rotate in the first direction X without being stopped by the negative magnetic force.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. A driving device, comprising:
a power supply unit that outputs a constant power; and
a torque converter, having;
a flywheel;
an input shaft;
a first variable-diameter pulley mounted on said input shaft, and having first and second half portions, said second half portion having a control unit that causes said second half portion to move away from said first half portion when a rotational speed of said first variable-diameter pulley increases, thereby decreasing an effective diameter of said first variable-diameter pulley, and causing said second half portion to move toward said first half portion when a rotational speed of said first variable-diameter pulley decreases, thereby increasing the effective diameter of said first variable-diameter pulley;
an output shaft;
a second variable-diameter pulley mounted on said output shaft, and having third and fourth half portions that are movable toward and away from one another to respectively increase and decrease an effective diameter of said second variable-diameter pulley;
a belt member disposed on and interconnecting said first and second variable-diameter pulleys, wherein when said first and second half portions of said first variable-diameter pulley move away from one another, said third and fourth half portions of said second variable-diameter pulley move toward one another, and when said first and second half portions move toward one another, said third and fourth half portions move away from one another, thereby maintaining said belt member under tension; and
a gear train connected to said power supply unit and interconnecting said flywheel and said input shaft in order to respectively transmit a first portion of the power to said flywheel and a second portion of the power to said input shaft, said belt member transmitting the second portion of the power from said input shaft to said output shaft by way of said first and second variable-diameter pulleys, the second portion of the power exerting a torque on said input and output shafts to cause said input and output shafts to rotate at respective predetermined rotational speeds,
whereby when a torque exerted on said output shaft by a load is increased, the rotational speed of said input shaft correspondingly decreases so that said second half portion of said first variable-diameter pulley automatically moves toward said first half portion of said first variable-diameter pulley by means of said control unit, and a rotational speed of said flywheel decreases to transmit power to said output shaft; and
when a torque exerted on said output shaft by the load is decreased, the rotational speed of said input shaft correspondingly increases, so that said second half portion of said first variable-diameter pulley automatically moves away from said first half portion of said first variable-diameter pulley by means of said control unit, and the rotational speed of said flywheel increases to receive power from said output shaft;
whereby the predetermined rotational speed of said output shaft is maintained constant without increasing or decreasing the power from said power supply unit, wherein said power supply unit comprises:
a base;
a first magnetic device mounted on said base and exerting a first magnetic field;
a transmission member rotatably mounted on said base and connected to said gear train; and
a second magnetic device connected to said transmission member and exerting a second magnetic field, said second magnetic device being movable together with said transmission member in a first direction to periodically pass by said first magnetic device, the first and second magnetic fields interacting with one another when said second magnetic device passes by said first magnetic device to alternately exert a positive force and a negative force on said first and second magnetic devices, the positive force causing said second magnetic device to move relative to said first magnetic device in the first direction, the negative force action against said second magnetic device in a second direction that is opposite to the first direction.

2. The driving device as claimed in claim 1, wherein when said second magnetic device is disposed adjacent to said first magnetic device, said first and second magnetic devices are in an interaction position in which the positive force acts to move said second magnetic device away from said first magnetic device in the first direction to produce an inertia force, the inertia force and the positive force acting on said second magnetic device to move said second magnetic device and said transmission member to pass over a counterbalance position without being stopped by said negative force and to then move in the first direction back to the interaction position, said second magnetic device moving periodically between the interaction position and the counterbalance position, resulting in movement of said transmission member in the first direction without being stopped by the negative force.

* * * * *